(12) United States Patent
Helmer

(10) Patent No.: US 12,482,547 B2
(45) Date of Patent: Nov. 25, 2025

(54) AUXILIARY DEVICE AND REMINDER SYSTEM FOR A DRUG DELIVERY DEVICE

(71) Applicant: Sanofi, Paris (FR)

(72) Inventor: Michael Helmer, Frankfurt am Main (DE)

(73) Assignee: Sanofi, Paris (FR)

( * ) Notice: Subject to any disclaimer, the term of this patent is extended or adjusted under 35 U.S.C. 154(b) by 888 days.

(21) Appl. No.: 17/769,148

(22) PCT Filed: Oct. 26, 2020

(86) PCT No.: PCT/EP2020/080010
§ 371 (c)(1),
(2) Date: Apr. 14, 2022

(87) PCT Pub. No.: WO2021/083828
PCT Pub. Date: May 6, 2021

(65) Prior Publication Data
US 2023/0033566 A1 Feb. 2, 2023

(30) Foreign Application Priority Data
Oct. 28, 2019 (EP) .................................... 19306396

(51) Int. Cl.
*G16H 20/17* (2018.01)
*G16H 40/67* (2018.01)

(52) U.S. Cl.
CPC ............. *G16H 20/17* (2018.01); *G16H 40/67* (2018.01); *A61M 2205/50* (2013.01)

(58) Field of Classification Search
None
See application file for complete search history.

(56) References Cited

U.S. PATENT DOCUMENTS 6,406,443 B1 * 6/2002 Talish ...................... A61N 7/00
601/2
9,186,465 B2 * 11/2015 Jørgensen ......... A61M 5/31551
(Continued)

FOREIGN PATENT DOCUMENTS

EP 3381493 10/2018
JP 200225383 A 8/2003
(Continued)

OTHER PUBLICATIONS

International Preliminary Report on Patentability in International Appln. No. PCT/EP2020/080010, dated May 12, 2022, 9 pages.
(Continued)

*Primary Examiner* — Manuel A Mendez
(74) *Attorney, Agent, or Firm* — Bond, Schoeneck & King, PLLC

(57) ABSTRACT

In one aspect, the disclosure relates to a reminder system and to an auxiliary device for a drug delivery device. The auxiliary device includes a housing, a wireless communication interface configured to communicate with an external electronic device, a processor connected to the wireless communication interface and configured to process at least a signal generating request received from the external electronic device via the wireless communication interface. The auxiliary device further includes at least one signal generator connected to the processor and configured to generate at least one signal when triggered by the processor. The processor is operable to trigger the signal generator in response to receive a signal generating request from the wireless communication interface.

18 Claims, 4 Drawing Sheets

(56) References Cited

U.S. PATENT DOCUMENTS

| | | | |
|---|---|---|---|
| 2015/0202376 A1* | 7/2015 | Haupt | A61M 5/31525 604/189 |
| 2017/0132392 A1* | 5/2017 | Gerken | A61M 5/31548 |
| 2017/0196774 A1 | 7/2017 | Ohl et al. | |
| 2018/0099084 A1 | 4/2018 | Schabbach et al. | |
| 2019/0184111 A1 | 6/2019 | Sjolund et al. | |
| 2023/0033566 A1 | 2/2023 | Helmer | |

FOREIGN PATENT DOCUMENTS

| | | |
|---|---|---|
| JP | 2016002366 A | 1/2016 |
| JP | 2018138211 A | 9/2018 |
| WO | 2020080010 A1 | 4/2020 |
| WO | 2021083828 A1 | 5/2021 |

OTHER PUBLICATIONS

International Search Report and Written Opinion in International Appln No. PCT/EP2020/080010, dated Dec. 4, 2020, 12 pages.
Decision of Rejection, JP Patent Application No. 2022-524974, dated Nov. 12, 2024, pp. 1-7 (with pp. 1-3 being a translation).
EP Office Action, Application No. 207933904, dated Mar. 19, 2025, pp. 1-6.
Notice of Reasons for Rejection, JP Patent Application No. 2022-524974, dated Jul. 9, 2024, pp. 1-15 (with pp. 1-7 being a translation).

* cited by examiner

AUXILIARY DEVICE AND REMINDER SYSTEM FOR A DRUG DELIVERY DEVICE

CROSS REFERENCE TO RELATED APPLICATIONS

The present application is the national stage entry of International Patent Application No. PCT/EP2020/080010, filed on Oct. 26, 2020, and claims priority to Application No. EP 19306396.3, filed on Oct. 28, 2019, the disclosures of which are incorporated herein by reference.

TECHNICAL FIELD

The present disclosure relates to an auxiliary device for a drug delivery device. In one aspect the disclosure relates to a reminder system including such an auxiliary device and further including an external electronic device. In a further aspect the disclosure relates to a method of reminding a person to administer a medicament by using an auxiliary device. Typically, the auxiliary device and the reminder system is or are provided to remind a person or patient to administer a medicament, typically by using a drug delivery device, such as an injection device. The auxiliary device and the reminder system is or are particularly applicable and implementable in combination with injection devices, such as handheld injection devices, e.g., pen-type injectors. In a further aspect the disclosure relates to a non-transitory machine-readable medium storing instructions executable by a processor of an auxiliary device and/or executable by a processor of an external electronic device. In a further aspect the disclosure relates to a method of reminding a person to administer a medicament by using an auxiliary device and/or by using a drug delivery device.

BACKGROUND

Drug delivery devices for setting and dispensing a single or multiple doses of a liquid medicament are as such well-known in the art. Generally, such devices have substantially a similar purpose as that of an ordinary syringe.

Drug delivery devices, such as pen-type injectors have to meet a number of user-specific requirements. For instance, with patient's suffering chronic diseases, such like diabetes, the patient may be physically infirm and may also have impaired vision. Suitable drug delivery devices are especially intended for home medication and therefore need to be robust in construction and should be easy to use. Furthermore, manipulation and general handling of the device and its components should be intelligible and easy understandable. Such injection devices should provide setting and subsequent dispensing of a dose of a medicament of variable size. Moreover, a dose setting as well as a dose dispensing procedure must be easy to operate and has to be unambiguous.

SUMMARY

Injection devices include a housing or a particular cartridge holder, adapted to receive a cartridge at least partially filled with the medicament to be dispensed. The device further includes a drive mechanism, usually having a displaceable piston rod to operably engage with a bung or piston of the cartridge. By means of the drive mechanism and its piston rod, the bung or piston of the cartridge is displaceable in a distal or dispensing direction and may therefore expel a predefined amount of the medicament via a piercing assembly, e.g., in form of an injection needle, which is to be releasably coupled with a distal end section of the housing of the drug delivery device.

With some examples the medicament to be dispensed by the drug delivery device may be provided and contained in a multi-dose cartridge. Such cartridges typically include a vitreous barrel sealed in distal direction by means of a pierceable seal and being further sealed in proximal direction by the piston. With reusable drug delivery devices an empty cartridge is replaceable by a new one. In contrast to that, drug delivery devices of disposable type are to be entirely discarded when the medicament in the cartridge has been dispensed or used-up.

With some drug delivery devices, such as pen-type injection devices a user has to set a dose of variable size by rotating a dose dial and a dose dial sleeve in a clockwise or dose-incrementing direction relative to a body or housing of the injection device. For injecting and expelling of a dose of a liquid medicament the user will have to depress a trigger or dose button in a distal direction and hence towards the body or housing of the injection device. Typically, the user uses his thumb for exerting a distally directed pressure onto the dose button, which is located at a proximal end of the dose dial and the dose dial sleeve, while holding the housing of the injection device with the remaining fingers of the same hand.

There exist injection devices, such as pen-type injectors that are configured as disposable devices. They are pre-filled with an injectable medicament. When the medicament is used up the entire injection device it is intended to be discarded. There exist also reusable injection devices that are equipped with a medicament container or medicament reservoir which is intended to be exchanged once the medicament contained therein has been used up. Such reusable injection devices enable a replacement of a medicament reservoir or medicament container, such as a cartridge.

Medical treatment by using a drug delivery device, such as an injection device may require regular and/or timely administering of the respective medicament in accordance to a given medicament prescription schedule.

Portable electronic devices, such as mobile phones, smartphones or tablet computers as well as smart watches may rather easily offer the possibility of recording or logging health-related parameters or data of a person or patient. With such portable electronic devices the person or patient can easily connect or communicate with medical care givers or healthcare providers, e.g., via dedicated software applications implemented or installed and deployed in or on the mobile electronic device. By means of such mobile electronic devices network assisted communication between the patient or end consumer and a care giver and/or healthcare provider can be easily established.

Drug delivery devices, such as injection devices or pen-type injectors may not offer the possibility to communicate with medical care givers or healthcare providers. Commercially available drug delivery devices may be implemented all mechanically and may be void of electronic components. When a particular drug delivery device should be regularly used by a patient it may be of importance, that the patient follows a given medicament prescription schedule defining at which time or day a certain amount of the medicament, i.e. a dose should be administered.

For patients it is sometimes rather cumbersome to remember if a medicament has already been administered or if a prescribed administering is still due. Moreover, a patient may also forget about the correct dose size that has to be administered at a certain point in time or at a certain period of a day.

It can be helpful to bring together the data connectivity and the possibilities of data communication offered by a mobile electronic device with the capability of a medical device, drug delivery device, e.g., of an all mechanically implemented drug delivery device, such as a handheld injection device for injection pen. Moreover, the overall handling of an injection device should be simplified and patient safety, in particular with regard to compliance to a given medicament prescription schedule should be improved.

The present disclosure aims to provide significant benefits in terms of a user-friendly handling of an injection device at low or moderate cost. It is a further aim to provide a solution that is highly acceptable and attractive for the patient using a drug delivery device, such as a handheld injection device. In a further aspect the present disclosure aims to provide data connectivity to a drug delivery device without the necessity to equip the drug delivery device with a rather complicated or sophisticated smart electronic device. It is a particular aim to enable a retrofitting of existing drug delivery devices with supplemental functions.

In one aspect there is provided an auxiliary device for a drug delivery device. The auxiliary device may be particularly dedicated and configured for use with an injection device, e.g., a handheld injection device, such as an injection pen. The injection device may be of disposable or reusable type. The auxiliary device includes a housing and a wireless communication interface. The wireless communication interface is configured to communicate with an external electronic device. Of course, the external electronic device also includes a corresponding wireless communication interface in order to establish a communication link to the wireless communication interface and hence to the auxiliary device. The auxiliary device further includes a processor connected to the wireless communication interface. The processor is configured to process at least a signal generating request that is received from the external electronic device via the wireless communication interface. The auxiliary device further includes at least one signal generator connected to the processor. The signal generator is configured to generate at least one signal when triggered by the processor. Moreover, the processor is operable to trigger the signal generator in response to receive a signal generating request from the wireless communication interface.

Typically, the auxiliary device is in a wireless communication mode with the external electronic device. The auxiliary device is capable to maintain a wireless communication link between its wireless communication interface and a respective wireless communication interface of the external electronic device. Existence or and/or maintenance of the wireless communication link between the auxiliary device and the external electronic device is a precondition to receive the signal generating request from the wireless communication interface, to trigger the signal generator by the processor in response to receive the signal generating request and to generate at least one signal by the at least one signal generator when triggered by the processor.

In other words, the auxiliary device equipped with the wireless communication interface, the processor and the signal generator is configured to generate a signal through activation of the at least one signal generator. Generation of the signal can be triggered remote and via the wireless communication interface by the external electronic device. In detail, the wireless communication interface and the communication link with the external electronic device enables transmission of a signal generating request from the external electronic device to the auxiliary device. The wireless communication interface receiving the signal generating request forwards the signal generating request to the processor and the processor, in response to receive the signal generating request, triggers the signal generator to generate the signal.

In this way the signal generator of the auxiliary device can be triggered remotely by the external electronic device. In typical scenarios of use the external electronic device is a portable electronic device, such as a mobile phone, a smartphone, a smart watch or a tablet computer. The external electronic device may also be implemented as a personal computer or some other computing or smart electronic device, typically owned or accessed by the patient.

The auxiliary device is configured to wirelessly connect to the external electronic device. In this way, the external electronic device is enabled to trigger and to invoke a signal generation on the auxiliary device. The auxiliary device may be located at a dedicated position in the household of the patient or in the environment of the patient. The auxiliary device can be located in the area of coverage of the wireless communication of the external electronic device.

With some examples, the generation and transmission of a signal generating request is automatically or autonomously triggered by the external electronic device, e.g., in accordance to an individually programmed and/or preconfigured schedule. The programmed and/or preconfigured schedule may be a temporal schedule indicating at which date and/or point of time a signal generating request is or will be generated and to be submitted wirelessly to the auxiliary device by the by the external electronic device. The signal generator request as generated by the external electronic device typically comprises or constitutes at least one of a reminder and an alert. This way, when adequately processed by the processor of the auxiliary device and when generating the at least one signal by the at least one signal generator of the auxiliary device the at least one signal generator provides a respective reminder or alert to a user, that a user interaction with the auxiliary device and/or with the drug delivery device is currently due or overdue.

On the external electronic device there may be implemented a software application, e.g., an App, that is provided with a prescribed medication schedule. As soon as delivery or administering of a dose of the medicament is due, the external electronic device may be configured to generate the signal generating request and to submit the signal generating request to the auxiliary device. When receiving the signal generating request the at least one signal generator of the auxiliary device will generate a respective signal thus indicating to a user or patient that administering of a dose of the medicament is actually due.

The auxiliary device, in particular the housing of the auxiliary device can be positioned or attached to a variety of different objects. The auxiliary device may be located at a dedicated position in a bathroom or a living room or in a kitchen of a household of a patient. Moreover, it is conceivable, that the patient is equipped with numerous auxiliary devices that are distributed in the patient's environment. The auxiliary device can be also positioned at a housing or a component of the drug delivery device, e.g., implemented as an injection device.

The auxiliary device may be void of a data storage and may be thus inoperable to store a prescribed medication schedule. The function of the auxiliary device may be limited to the receiving of signal generating requests from the external electronic device and to generate respective signals in response by activating the signal generator. In this way, the production costs of the auxiliary device can be kept at a rather low level and the auxiliary device can be easily distributed with disposable injection or drug delivery devices. In effect, the auxiliary device itself can be implemented as a disposable device since its electronic components, i.e. the processor and/or the at least one signal generator and the wireless communication interface are low cost and mass-manufactured disposable electronic components. In effect, the auxiliary device may act and behave as a pager that is limited to receive signal generating requests from the external electronic device and to generate a signal perceivable by a person or patient in order to remind the person or patient to administer a dose of the medicament.

With a typical example, the auxiliary device is further provided with an energy storage. The energy storage is typically arranged inside the housing or is attached to the housing externally. The energy storage may be detachable from the housing and may be hence detachable from the wireless communication interface, the processor and the at least one signal generator. Typically, the energy storage includes an electric energy storage, such as a battery. The battery or the electric energy source may be detachably mounted or arranged in or on the housing. After use of the auxiliary device the energy storage may be detached from the auxiliary device thus reducing waste or garbage and enabling a recycling of the energy storage for further use. Moreover, a detachable energy storage is beneficial in terms of an ecological friendly discarding of, e.g., a disposable auxiliary device.

According to another example the auxiliary device further includes at least one input member. The input member is connected to at least one of the processor and the at least one signal generator. When actuated by a user, the input member is operable to suppress or to deactivate the generation of the at least one signal by the signal generator. In typical scenarios the at least one signal generator is triggered by the processor to generate the at least one signal. A user becoming aware of the signal may deactivate the signal generation or may at least suspend the signal generation by actuating the at least one input member. Typically, the user may depress the input member to stop or to suspend the generation of the signal. With some examples the input member is implemented as a button, e.g., as a push button that requires depression in order to stop or to suspend the signal generation. With the at least one input member the user is given the possibility to interrupt or to abort the automatic signal generation, which is typically triggered by the external electronic device.

According to a further example the auxiliary device includes a fastener that is attached to the housing or which is integrated into the housing of the auxiliary device. The fastener is configured to attach, to fasten or to fix the auxiliary device to an object. There are numerous and different types of fasteners conceivable for the auxiliary device depending on the specific implementation of the auxiliary device. Moreover, it is conceivable to attach or to fasten the auxiliary device to a number of different objects. For instance, a mirror in a bathroom may serve as an object to which the auxiliary device could be attached, e.g., by way of an adhesive.

Likewise, any further object providing a rather plane-shaped surface suitable for an adhesive fastening of the fastener can be used for an attachment of the auxiliary device. With some examples the housing of the drug delivery device also serves as an object to which the auxiliary device can be fastened. The auxiliary device can be further fastened to a protective cap of a drug delivery device. With some examples the auxiliary device may even be integrated into a detachable cap of a drug delivery device or an injection device. With some examples the housing of the auxiliary device is a housing separate from the housing of the drug delivery device. With other examples, the housing of the auxiliary device may be implemented or integrated into the housing of the drug delivery device. With some further examples, the auxiliary device may be integrated into a housing component of a drug delivery device, e.g., in a detachable protective cap of an injection device, e.g., of a pen-type injector.

The fastener of the auxiliary device enables a universal fastening of the auxiliary device to any other object. With numerous examples the auxiliary device is attachable to the housing of the drug delivery device. When attached to the drug delivery device and upon generating a signal as triggered by the external electronic device the auxiliary device may help to find the drug delivery device in circumstances, wherein the patient or person is unaware, where the drug delivery device is actually located.

In a further example the fastener of the auxiliary device is attached to or integrated into a lower side of the housing of the auxiliary device. The fastener includes at least one of an adhesive, a snap member and a groove or recess to establish a mechanical connection to the object. With some examples, the entirety of the lower side or at least a portion thereof may be provided with an adhesive coating or adhesive layer. In this way the housing of the auxiliary device and the auxiliary device in its entirely can be adhesively attached to the object.

Additionally or alternatively the fastener may include at least one mechanical engaging member, such as a snap member, a groove or a recess to engage with correspondingly-shaped counter engaging member of a counter fastener of the object. For instance, the fastener of the auxiliary device may include at least one or several snap members to engage with correspondingly or complementary-shaped counter snap members of the object. The engaging members and/or counter engaging members may include protruding structures or recess structures in order to establish and to form a form fitting connection between the fastener of the auxiliary device and a correspondingly or complementary-shaped counter-fastener of the object.

According to a further example the signal generator is configured to generate at least one of a visual signal, an audible signal and a haptic signal. In this way, the signal generator may include at least one of a visual signal generator, e.g., in form of a blinking light or a display, an acoustic signal generator, typically a loud speaker or noise generating component and a haptic signal generator, such as an electromechanical vibration device connected to or engaged with the housing of the auxiliary device. The signal generator may also include a combination of a visual signal generator, an acoustic signal generator and/or a haptic signal generator. The signal generator may be configured to generate visual, audible and/or haptic signals either sequentially or simultaneously.

It is conceivable, that the processor and the at least one signal generator are configured to initiate a signal generating sequence that starts with the generation of a visual signal, e.g., a flashing or blinking light generated by the visual signal generator. After a predefined time period the processor and/or the at least one signal generator may start to generate an acoustic signal by the acoustic signal generator. If a user would not react appropriately, e.g., by actuating the input member the signal generation sequence may continue with the supplemental generation of a haptic signal, e.g., by generating a vibration of the auxiliary device. Other signal generating sequences are also possible, e.g., starting with a vibration signal, followed by a visual signal and finally followed by an audible signal, e.g., even with increasing volume.

A signal generating scheme or a signal generating sequence may be reconfigurable by a respective pre- or reprogramming of the processor and/or of the at least one signal generator. In this way, the auxiliary device can be individually adapted to the preferences of a user or patient.

In another example the input member of the auxiliary device includes a depressible button that is arranged in a recess of the housing. The recess of the housing may include an aperture in the housing. Here, it is of particular benefit, when the button is depressible inside the housing. In an idle or initial configuration the button may not protrude from an outside surface of the housing. In the initial or idle configuration the button or the input member may be located in a recessed portion of the housing. A depressible surface of the button is typically arranged inside a recess and is hence in a recessed position compared to the outside surface of the housing surrounding or adjacent to the recess or aperture.

The recessed arrangement of the input member and/or of the depressible button in or on the housing of the auxiliary device is beneficial to prevent or to avoid inadvertent actuation of the input member or to avoid or to prevent inadvertent depressing of the depressible button. Typically, the diameter of the recess is sized to receive a fingertip of a user. In this way, a user may easily reach the input member or the depressible button with a fingertip if he wants to actuate the input member.

With some other examples, the diameter or inner cross-section of the recess may be smaller than the cross-section or diameter of a user's fingertip. The recess may be sized to receive a dedicated component of the drug delivery device, such as a tipped outer needle cap or inner needle cap of a pen-type injector. In this way, it is somehow guaranteed, that the depressible button or the input member can only be depressed or actuated when the user has a dedicated device component at hand. In this way the user is somehow obliged to make use of the drug delivery device if he wants to deactivate the signal generated by the signal generator of the auxiliary device.

According to a further example the signal generator is integrated into the input member. In particular, the depressible button may include an illumination or the depressible button may be implemented as an illuminated depressible button. Here and in this way the at least one signal generator may be configured to illuminate the button or the input member. In this way, constructional space for the auxiliary device can be reduced to a minimum and the overall dimensions of the auxiliary device can be kept rather small. This enables a rather easy and beneficial implementation of the auxiliary device. Moreover, fastening of a miniaturized auxiliary device to the housing of a drug delivery device is rather easy and straight forward. A rather compact and small sized auxiliary device may also be quite attractive to the user or patient.

According to a further example the auxiliary device includes a data storage connected to the processor or integrated into the processor. The data storage is configured to log or to record at least one point in time at which a) the signal generator is triggered and/or b) at which the input member is actuated by the user. The data storage offers a quasi-automated monitoring of the activation and/or operation of the auxiliary device. Typically, the auxiliary device is automatically activated by the external electronic device. Operation of the auxiliary device by the user typically occurs when the user actuates the input member.

With the data storage the auxiliary device is configured and enabled to store or to log numerous activation or operation scenarios of the auxiliary device, which presumably coincide with a respective use of the drug delivery device. With the data storage a regular or irregular synchronization of data between the external electronic device and the auxiliary device can take place. In this way, data stored in the data storage in response to a user actuating the input member after activation of a signal generation can be stored and respective stored or logged data can be synchronized or compared with the prescribed medication data. In this way, compliance of the patient with the prescribed medication schedule can be determined and/or evaluated.

Providing of a data storage to the auxiliary device further offers the possibility that the auxiliary device may operate in a stand-alone mode and that the auxiliary device is configured to generate at least one or several occurrences of a signal generation stand-alone, i.e. without being triggered by the external electronic device. For this, the auxiliary device typically includes a clock generator that may be implemented or integrated into the processor. The clock generator or processor may be further operable or configured to trigger a signal generation by the signal generator in accordance to data stored in the data storage of the auxiliary device. Such an example is of particular use when the auxiliary device would be used in areas that are out of coverage of the wireless communication of the external electronic device or in situations, in which the external electronic device can be switched off or in which the external electronic device can be out of function.

Moreover, the auxiliary device, in particular at least one of the signal generator and the processor may be provided with a failsafe mode. For this, the processor and/or the signal generator may be configured to generate an alert signal in the event, that no signal generating request has been received from the external electronic device over a maximum allowable time. For instance and if a prescribed medication schedule requires that a medicament is administered at least once per day the processor and/or the signal generator may be configured to generate at least one signal every 25 hours. If the data communication with the external electronic device works properly the external electronic device will trigger at least one signal generation every 24 hours. If for some reason the external electronic device has not submitted at least a signal generating request during the last 24 or 25 hours all the auxiliary device has not received a respective signal generating request during the last 24 or 25 hours the processor and/or the signal generator of the auxiliary device will be configured to automatically generate an alert or failure signal. This may prompt the user or patient to check the data connection between the auxiliary device and the external electronic device.

According to another example the at least one signal generator includes a reconfigurable electronic display connected to the processor. The processor is configured to modify a content of the electronic display in response to receive a signal generating request from the wireless communication interface. As an alternative the processor may be configured to modify a content of the electronic display in response to a user operating or activating the input member. The electronic display can be used as a visual signaling device and may just represent a visual signal generator. The reconfigurable electronic display typically includes a two-dimensional array of visually reconfigurable pixels. With some examples the electronic display may simply indicate to a user the prescribed amount of the medicament that can be actually set and/or dispensed or administered by the drug delivery device.

The reconfigurable electronic display may provide supplemental information to the patient with regard to the handling of the drug delivery device or may provide feedback with regard to the physiological condition of the patient. The reconfigurable electronic display may be provided in addition to a visual signal generator, e.g., in addition to an input member that can be illuminated, e.g., provided in form of an illuminated button.

Once the signal has been generated by the signal generator the reconfigurable electronic display may indicate to a user to depress the input member. In response to an initial depression of the input member the signal generated by the signal generator may stop or may be suspended. In addition or subsequent thereto the content of the reconfigurable electronic display may change. In typical scenarios the reconfigurable electronic display may provide supplemental information to the user, regarding the number of units or the size of the dose that can be set and dispensed or injected by the drug delivery device. When the user repeatedly actuates the input member the reconfigurable electronic display may provide further instructions to the user regarding use of the drug delivery device. The reconfigurable electronic display may guide the user through the process of appropriately using the drug delivery device. In this way patient safety can be further enhanced.

According to a further example the auxiliary device further includes a printed circuit board. The wireless communication interface, the processor and the signal generator are arranged on the printed circuit board. When provided with an input member also the input member, e.g., a depressible button, can be arranged on the printed circuit board. In this way all electronic components or electromechanical components of the auxiliary device can be arranged on one and the same printed circuit board. This provides a rather integrated electronic or electromechanical solution that can be easily assembled inside the housing of the auxiliary device.

By making use of a printed circuit board, at least the electrical connections between the wireless communication interface, the processor, the signal generator and/or the input member can be printed or coated on the printed circuit board. Also, the wireless communication interface, e.g., an antenna or some further components of the wireless communication interface can be directly printed or coated on the printed circuit board. This may help to reduce manufacturing costs and to save construction space for the manufacturing and implementation of the auxiliary device.

In another example the auxiliary device includes a stacked electronic assembly. Moreover, the housing of the auxiliary device includes a recess or an aperture. The recess or aperture is configured to receive the stacked electronic assembly. The stacked electronic assembly includes an energy storage, the above described printed circuit board and the input member stacked on one another. With typical implementations, the energy storage, e.g., in form of a button battery is connected to or arranged on one side, e.g., at a lower side of the printed circuit board. At least one of the further components of the stacked electronic assembly, namely at least one of the processor, the signal generator and the wireless communication interface are located and/or assembled on an oppositely located side, e.g., an upper side of the printed circuit board.

The input member, e.g., in form of a depressible button may be arranged on top of the printed circuit board and hence on top of at least one of the wireless communication interface, the processor and the signal generator. With some examples, the input member may be located in a cover that closes the recess or aperture of the housing with the stacked electronic assembly located therein. In this way, the input member may also be provided separate from the stacked electronic assembly.

With some examples the stacked electronic assembly at least including the wireless communication interface, the processor and the signal generator optionally assembled on a printed circuit board, is fixed to a frame or mount and the frame or mount is arrangeable or mountable inside the recess or aperture of the housing of the auxiliary device. Arranging the stacked electronic assembly in a frame or mount enables a dismounting and/or a detaching or releasable connection of the stacked electronic assembly in its entirety from the auxiliary device. In situations where the energy storage of the auxiliary device can require recharging or replacement the entire frame or mount can be detached from the housing of the auxiliary device thus enabling a replacement of the energy storage and a respective re-insertion or re-engagement of the frame and hence of the stacked electronic assembly with the housing of the auxiliary device.

According to another aspect the disclosure also relates to a reminder system that is operable to remind a person or patient to administer a medicament by using a drug delivery device. The reminder system includes an auxiliary device as described above and an external electronic device that is operable to establish a wireless communication link to the wireless communication interface of the auxiliary device. Moreover, the external electronic device is operable to generate and to transmit a signal generating request to the auxiliary device. Generation and transmission of a signal generating request is typically automatically triggered by the external electronic device in accordance to an individually programmed and/or preconfigured schedule, e.g., a medication schedule.

The programmed and/or preconfigured schedule may be a temporal schedule indicating at which date and/or point of time a signal generating request is or will be generated and to be submitted wirelessly to the auxiliary device by the by the external electronic device. The signal generator request as generated by the external electronic device typically comprises or constitutes at least one of a reminder and an alert. This way, when adequately processed by the processor of the auxiliary device and when generating the at least one signal by the at least one signal generator of the auxiliary device the at least one signal generator provides a respective reminder or alert to a user, that a user interaction with the auxiliary device and/or with the drug delivery device is currently due or overdue.

The reminder system may include more than only one auxiliary device. The reminder system may be equipped with numerous auxiliary devices each of which being operable to receive at least a signal generating request generated and transmitted by the external electronic device. The external electronic device is typically implemented as a smart device. It may include or may be one of a mobile phone, a smartphone, a smart watch and a tablet computer. With some examples the external electronic device is configured as a router providing a data connection to the internet. In this way, the external electronic device may simply provide a communication link to a computer network of a healthcare provider or of a care giver.

As described above, the auxiliary device may be positioned at a dedicated place in the environment of a person or patient. The auxiliary device may be configured for adhesive attachment, e.g., to a mirror in a bathroom or to some other suitable or characteristic places in the household of the patient or person. The auxiliary device may be fastened or mechanically connected to a housing or housing component of a drug delivery device.

According to a further example the reminder system further includes a drug delivery device. The drug delivery device may be implemented as an injection device, typically as a handheld injection device. The auxiliary device of the reminder system is then typically provided with a fastener configured to fasten the auxiliary device to at least one housing component of the drug delivery device. Here, the fastener of the auxiliary device is configured to fasten the auxiliary device to the at least one housing component of the drug delivery device. With some examples, the auxiliary device and/or the housing of the auxiliary device may coincide with a housing component of the drug delivery device. In particular, the auxiliary device may be integrated into or attached to a detachable protective cap of an injection device, e.g., of a pen-type injector.

In a further aspect the disclosure further relates to a method of reminding a person to administer a medicament by using an auxiliary device as described above in combination with an external electronic device as described above. The method of reminding includes the steps of establishing a communication link between the external electronic device and the auxiliary device. Typically, the communication link is actively established by the external electronic device. The communication link may be based on a wireless communication protocol, such as Wi-Fi, NFC or RFID or Bluetooth.

The external electronic device may be configured to establish the communication link and to pair the external electronic device and the auxiliary device and to form or to establish a communication or data link between the external electronic device and the auxiliary device. The communication link is at least of downstream type. It may be sufficient when the communication link is a one-way communication link from the external electronic device to the auxiliary device. With some examples the communication link may be a bidirectional communication link, hence an uplink and downlink communication link, thus enabling also a data transmission from the auxiliary device to the external electronic device. In this way, the auxiliary device may provide a feedback signal to the external electronic device, e.g., confirming that a signal has been generated by the signal generator in response to a successful receipt of a signal generating request transmitted by the external electronic device.

The method further includes the step of generating a signal generating request by the external electronic device and further to transmit the signal generating request from the external electronic device to the auxiliary device. The signal generating request is typically wirelessly transmitted from the external electronic device to the auxiliary device. As a further step, at least one of a visual signal, an audible signal and a haptic signal or combinations thereof is or are provided by the signal generator of the auxiliary device in response to the receipt of the signal generating request from the external electronic device. Optionally and when the communication link between the external electronic device and the auxiliary device is of bidirectional type the auxiliary device may submit a confirmation to the external electronic device indicating to the external electronic device that at least one of a visual signal, an audible signal and a haptic signal has been generated by the signal generator of the auxiliary device.

The auxiliary device, the external electronic device and/or the reminder system as described above are configured to mutually interact so as to execute the above described method of reminding a person to administer a medicament. In so far, all features, benefits and configurations or steps described in connection with only one of the auxiliary device, the external electronic device, the reminder system and the method of reminding equally apply to all other entities of the auxiliary device, the reminder system, the external electronic device and the method of reminding; and vice versa.

In a further aspect the disclosure also relates to a non-transitory machine-readable medium storing instructions executable by a processor of an auxiliary device as described above and/or of executable by a processor of an external electronic device as described above. Execution of the instructions causes the respective processor to implement a method, wherein the method includes the steps of receiving a signal generating request from an external electronic device via the wireless communication interface of the auxiliary device and the further step to trigger the signal generator of the auxiliary device to generate a signal in response to the receiving of the signal generating request. The non-transitory machine-readable medium is particularly configured to generate the signal generating request through or by the external electronic device in accordance to a medicament prescription schedule.

The instructions executable by the processor of the auxiliary device and/or by the processor of the external electronic device are further configured to conduct the above described method of reminding a person to administer a medicament. At least some parts of the executable instructions are configured to be processed and to be executed by the processor of the auxiliary device whereas other instructions of the non-transitory machine-readable medium are executable by the processor of the external electronic device.

In the present context the term 'distal' or 'distal end' relates to an end of the injection device that faces towards an injection site of a person or of an animal. The term 'proximal' or 'proximal end' relates to an opposite end of the injection device, which is furthest away from an injection site of a person or of an animal.

The term "drug" or "medicament", as used herein, means a pharmaceutical formulation containing at least one pharmaceutically active compound, wherein in one embodiment the pharmaceutically active compound has a molecular weight up to 1500 Da and/or is a peptide, a protein, a polysaccharide, a vaccine, a DNA, a RNA, an enzyme, an antibody or a fragment thereof, a hormone or an oligonucleotide, or a mixture of the above-mentioned pharmaceutically active compound, wherein in a further embodiment the pharmaceutically active compound is useful for the treatment and/or prophylaxis of diabetes mellitus or complications associated with diabetes mellitus such as diabetic retinopathy, thromboembolism disorders such as deep vein or pulmonary thromboembolism, acute coronary syndrome (ACS), angina, myocardial infarction, cancer, macular degeneration, inflammation, hay fever, atherosclerosis and/or rheumatoid arthritis, wherein in a further embodiment the pharmaceutically active compound includes at least one peptide for the treatment and/or prophylaxis of diabetes mellitus or complications associated with diabetes mellitus such as diabetic retinopathy, wherein in a further embodiment the pharmaceutically active compound includes at least one human insulin or a human insulin analogue or derivative, glucagon-like peptide (GLP-1) or an analogue or derivative thereof, or exendin-3 or exendin-4 or an analogue or derivative of exendin-3 or exendin-4.

Insulin analogues are for example Gly(A21), Arg(B31), Arg(B32) human insulin; Lys(B3), Glu(B29) human insulin; Lys(B28), Pro(B29) human insulin; Asp(B28) human insulin; human insulin, wherein proline in position B28 is replaced by Asp, Lys, Leu, Val or Ala and wherein in position B29 Lys may be replaced by Pro; Ala(B26) human insulin; Des(B28-B30) human insulin; Des(B27) human insulin and Des(B30) human insulin.

Insulin derivates are for example B29-N-myristoyl-des(B30) human insulin; B29-N-palmitoyl-des(B30) human insulin; B29-N-myristoyl human insulin; B29-N-palmitoyl human insulin; B28-N-myristoyl LysB28ProB29 human insulin; B28-N-palmitoyl-LysB28ProB29 human insulin; B30-N-myristoyl-ThrB29LysB30 human insulin; B30-N-palmitoyl-ThrB29LysB30 human insulin; B29-N—(N-palmitoyl-Y-glutamyl)-des(B30) human insulin; B29-N—(N-lithocholyl-Y-glutamyl)-des(B30) human insulin; B29-N-(ω-carboxyheptadecanoyl)-des(B30) human insulin and B29-N-(ω-carboxyheptadecanoyl) human insulin.

Exendin-4 for example means Exendin-4(1-39), a peptide of the sequence H-His-Gly-Glu-Gly-Thr-Phe-Thr-Ser-Asp-Leu-Ser-Lys-Gln-Met-Glu-Glu-Glu-Ala-Val-Arg-Leu-Phe-Ile-Glu-Trp-Leu-Lys-Asn-Gly-Gly-Pro-Ser-Ser-Gly-Ala-Pro-Pro-Pro-Ser-NH2.

Exendin-4 derivatives are for example selected from the following list of compounds:
H-(Lys)4-des Pro36, des Pro37 Exendin-4(1-39)-NH2,
H-(Lys)5-des Pro36, des Pro37 Exendin-4(1-39)-NH2,
des Pro36 Exendin-4(1-39),
des Pro36 [Asp28] Exendin-4(1-39),
des Pro36 [IsoAsp28] Exendin-4(1-39),
des Pro36 [Met(O)14, Asp28] Exendin-4(1-39),
des Pro36 [Met(O)14, IsoAsp28] Exendin-4(1-39),
des Pro36 [Trp(O2)25, Asp28] Exendin-4(1-39),
des Pro36 [Trp(O2)25, IsoAsp28] Exendin-4(1-39),
des Pro36 [Met(O)14 Trp(O2)25, Asp28] Exendin-4(1-39),
des Pro36 [Met(O)14 Trp(O2)25, IsoAsp28] Exendin-4(1-39); or
des Pro36 [Asp28] Exendin-4(1-39),
des Pro36 [IsoAsp28] Exendin-4(1-39),
des Pro36 [Met(O)14, Asp28] Exendin-4(1-39),
des Pro36 [Met(O)14, IsoAsp28] Exendin-4(1-39),
des Pro36 [Trp(O2)25, Asp28] Exendin-4(1-39),
des Pro36 [Trp(O2)25, IsoAsp28] Exendin-4(1-39),
des Pro36 [Met(O)14 Trp(O2)25, Asp28] Exendin-4(1-39),
des Pro36 [Met(O)14 Trp(O2)25, IsoAsp28] Exendin-4(1-39),
wherein the group -Lys6-NH2 may be bound to the C-terminus of the Exendin-4 derivative;
or an Exendin-4 derivative of the sequence
des Pro36 Exendin-4(1-39)-Lys6-NH2 (AVE0010),
H-(Lys)6-des Pro36 [Asp28] Exendin-4(1-39)-Lys6-NH2,
des Asp28 Pro36, Pro37, Pro38Exendin-4(1-39)-NH2,
H-(Lys)6-des Pro36, Pro38 [Asp28] Exendin-4(1-39)-NH2,
H-Asn-(Glu)5des Pro36, Pro37, Pro38 [Asp28] Exendin-4(1-39)-NH2,
des Pro36, Pro37, Pro38 [Asp28] Exendin-4(1-39)-(Lys)6-NH2,
H-(Lys)6-des Pro36, Pro37, Pro38 [Asp28] Exendin-4(1-39)-(Lys)6-NH2,
H-Asn-(Glu)5-des Pro36, Pro37, Pro38 [Asp28] Exendin-4(1-39)-(Lys)6-NH2,
H-(Lys)6-des Pro36 [Trp(O2)25, Asp28] Exendin-4(1-39)-Lys6-NH2,
H-des Asp28 Pro36, Pro37, Pro38 [Trp(02)25] Exendin-4(1-39)-NH2,
H-(Lys)6-des Pro36, Pro37, Pro38 [Trp(O2)25, Asp28] Exendin-4(1-39)-NH2,
H-Asn-(Glu)5-des Pro36, Pro37, Pro38 [Trp(O2)25, Asp28] Exendin-4(1-39)-NH2,
des Pro36, Pro37, Pro38 [Trp(O2)25, Asp28] Exendin-4(1-39)-(Lys)6-NH2,
H-(Lys)6-des Pro36, Pro37, Pro38 [Trp(O2)25, Asp28] Exendin-4(1-39)-(Lys)6-NH2,
H-Asn-(Glu)5-des Pro36, Pro37, Pro38 [Trp(O2)25, Asp28] Exendin-4(1-39)-(Lys)6-NH2,
H-(Lys)6-des Pro36 [Met(O)14, Asp28] Exendin-4(1-39)-Lys6-NH2,
des Met(O)14 Asp28 Pro36, Pro37, Pro38 Exendin-4(1-39)-NH2,
H-(Lys)6-desPro36, Pro37, Pro38 [Met(O)14, Asp28] Exendin-4(1-39)-NH2,
H-Asn-(Glu)5-des Pro36, Pro37, Pro38 [Met(O)14, Asp28] Exendin-4(1-39)-NH2,
des Pro36, Pro37, Pro38 [Met(O)14, Asp28] Exendin-4(1-39)-(Lys)6-NH2,
H-(Lys)6-des Pro36, Pro37, Pro38 [Met(O)14, Asp28] Exendin-4(1-39)-(Lys)6-NH2,
H-Asn-(Glu)5 des Pro36, Pro37, Pro38 [Met(O)14, Asp28] Exendin-4(1-39)-(Lys)6-NH2,
H-Lys6-des Pro36 [Met(O)14, Trp(O2)25, Asp28] Exendin-4(1-39)-Lys6-NH2,
H-des Asp28 Pro36, Pro37, Pro38 [Met(O)14, Trp(02)25] Exendin-4(1-39)-NH2,
H-(Lys)6-des Pro36, Pro37, Pro38 [Met(O)14, Asp28] Exendin-4(1-39)-NH2,
H-Asn-(Glu)5-des Pro36, Pro37, Pro38 [Met(O)14, Trp(O2)25, Asp28] Exendin-4(1-39)-NH2,
des Pro36, Pro37, Pro38 [Met(O)14, Trp(O2)25, Asp28] Exendin-4(1-39)-(Lys)6-NH2,
H-(Lys)6-des Pro36, Pro37, Pro38 [Met(O)14, Trp(O2)25, Asp28] Exendin-4(S1-39)-(Lys)6-NH2,
H-Asn-(Glu)5-des Pro36, Pro37, Pro38 [Met(O)14, Trp(O2)25, Asp28] Exendin-4(1-39)-(Lys)6-NH2;
or a pharmaceutically acceptable salt or solvate of any one of the afore-mentioned Exendin-4 derivative.

Hormones are for example hypophysis hormones or hypothalamus hormones or regulatory active peptides and their antagonists as listed in Rote Liste, ed. 2008, Chapter 50, such as Gonadotropine (Follitropin, Lutropin, Choriongonadotropin, Menotropin), Somatropine (Somatropin), Desmopressin, Terlipressin, Gonadorelin, Triptorelin, Leuprorelin, Buserelin, Nafarelin, Goserelin.

A polysaccharide is for example a glucosaminoglycane, a hyaluronic acid, a heparin, a low molecular weight heparin or an ultra low molecular weight heparin or a derivative thereof, or a sulphated, e.g., a poly-sulphated form of the above-mentioned polysaccharides, and/or a pharmaceutically acceptable salt thereof. An example of a pharmaceutically acceptable salt of a poly-sulphated low molecular weight heparin is enoxaparin sodium.

Antibodies are globular plasma proteins (~150 kDa) that are also known as immunoglobulins which share a basic structure. As they have sugar chains added to amino acid residues, they are glycoproteins. The basic functional unit of each antibody is an immunoglobulin (Ig) monomer (containing only one Ig unit); secreted antibodies can also be dimeric with two Ig units as with IgA, tetrameric with four Ig units like teleost fish IgM, or pentameric with five Ig units, like mammalian IgM.

The Ig monomer is a "Y"-shaped molecule that consists of four polypeptide chains; two identical heavy chains and two identical light chains connected by disulfide bonds between cysteine residues. Each heavy chain is about 440 amino acids long; each light chain is about 220 amino acids long. Heavy and light chains each contain intrachain disulfide bonds which stabilize their folding. Each chain is composed of structural domains called Ig domains. These domains contain about 70-110 amino acids and are classified into different categories (for example, variable or V, and constant or C) according to their size and function. They have a characteristic immunoglobulin fold in which two p sheets create a "sandwich" shape, held together by interactions between conserved cysteines and other charged amino acids.

There are five types of mammalian Ig heavy chain denoted by α, δ, ε, γ, and μ. The type of heavy chain present defines the isotype of antibody; these chains are found in IgA, IgD, IgE, IgG, and IgM antibodies, respectively.

Distinct heavy chains differ in size and composition; α and γ contain approximately 450 amino acids and δ approximately 500 amino acids, while μ and ε have approximately 550 amino acids. Each heavy chain has two regions, the constant region ($C_H$) and the variable region ($V_H$). In one species, the constant region is essentially identical in all antibodies of the same isotype, but differs in antibodies of different isotypes. Heavy chains γ, α and δ have a constant region composed of three tandem Ig domains, and a hinge region for added flexibility; heavy chains μ and ε have a constant region composed of four immunoglobulin domains. The variable region of the heavy chain differs in antibodies produced by different B cells, but is the same for all antibodies produced by a single B cell or B cell clone. The variable region of each heavy chain is approximately 110 amino acids long and is composed of a single Ig domain.

In mammals, there are two types of immunoglobulin light chain denoted by λ and κ. A light chain has two successive domains: one constant domain (CL) and one variable domain (VL). The approximate length of a light chain is 211 to 217 amino acids. Each antibody contains two light chains that are always identical; only one type of light chain, κ or λ, is present per antibody in mammals.

Although the general structure of all antibodies is very similar, the unique property of a given antibody is determined by the variable (V) regions, as detailed above. More specifically, variable loops, three each the light (VL) and three on the heavy (VH) chain, are responsible for binding to the antigen, i.e. for its antigen specificity. These loops are referred to as the Complementarity Determining Regions (CDRs). Because CDRs from both VH and VL domains contribute to the antigen-binding site, it is the combination of the heavy and the light chains, and not either alone, that determines the final antigen specificity.

An "antibody fragment" contains at least one antigen binding fragment as defined above, and exhibits essentially the same function and specificity as the complete antibody of which the fragment is derived from. Limited proteolytic digestion with papain cleaves the Ig prototype into three fragments. Two identical amino terminal fragments, each containing one entire L chain and about half an H chain, are the antigen binding fragments (Fab). The third fragment, similar in size but containing the carboxyl terminal half of both heavy chains with their interchain disulfide bond, is the crystallizable fragment (Fc). The Fc contains carbohydrates, complement-binding, and FcR-binding sites. Limited pepsin digestion yields a single F(ab')2 fragment containing both Fab pieces and the hinge region, including the H-H interchain disulfide bond. F(ab')2 is divalent for antigen binding. The disulfide bond of F(ab')2 may be cleaved in order to obtain Fab'. Moreover, the variable regions of the heavy and light chains can be fused together to form a single chain variable fragment (scFv).

Pharmaceutically acceptable salts are for example acid addition salts and basic salts. Acid addition salts are e.g., HCl or HBr salts. Basic salts are e.g., salts having a cation selected from alkali or alkaline, e.g., Na+, or K+, or Ca2+, or an ammonium ion N+(R1)(R2)(R3)(R4), wherein R1 to R4 independently of each other mean: hydrogen, an optionally substituted C1-C6-alkyl group, an optionally substituted C2-C6-alkenyl group, an optionally substituted C6-C10-aryl group, or an optionally substituted C6-C10-heteroaryl group. Further examples of pharmaceutically acceptable salts are described in "Remington's Pharmaceutical Sciences" 17. ed. Alfonso R. Gennaro (Ed.), Mark Publishing Company, Easton, Pa., U.S.A., 1985 and in Encyclopedia of Pharmaceutical Technology.

Pharmaceutically acceptable solvates are for example hydrates.

It will be further apparent to those skilled in the art that various modifications and variations can be made to the present disclosure without departing from the scope of the disclosure. Further, it is to be noted, that any reference numerals used in the appended claims are not to be construed as limiting the scope of the disclosure.

BRIEF DESCRIPTION OF THE FIGURES

In the following, numerous examples of the container and of an injection device will be described in greater detail by making reference to the drawings, in which.

DETAILED DESCRIPTION

Figure 1:
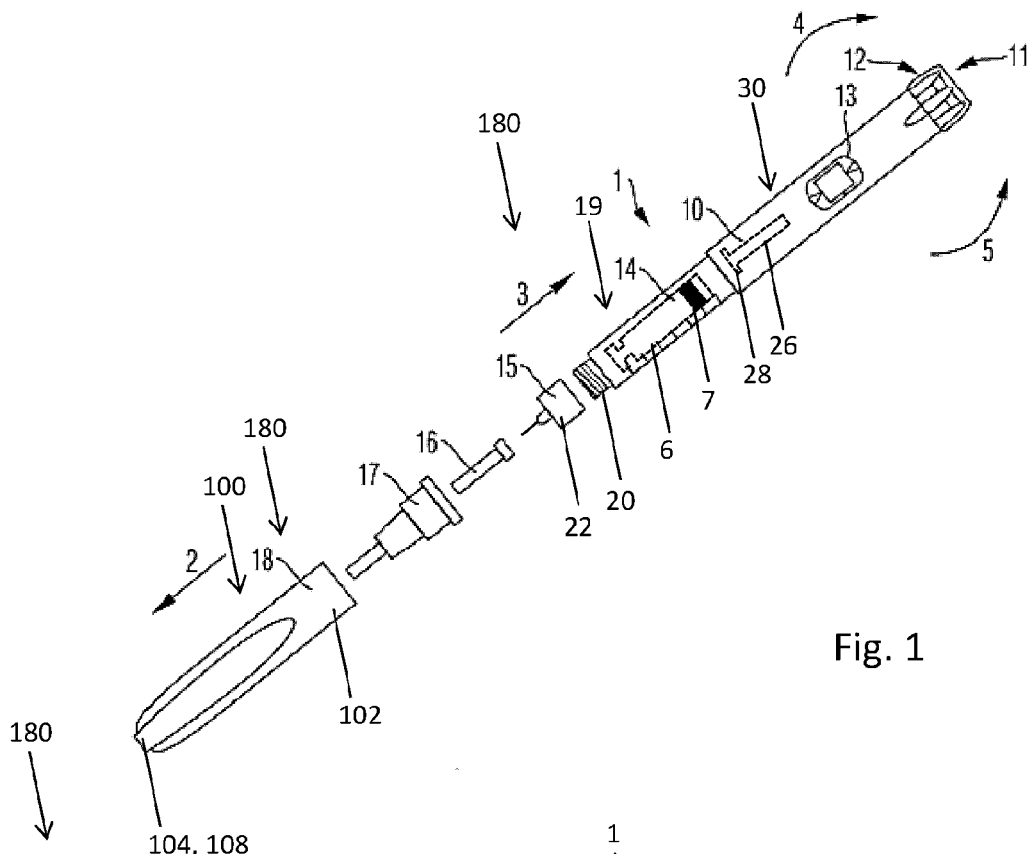
FIG. 1 schematically illustrates an example of a drug delivery device implemented as a handheld injection device.
Figure 2:
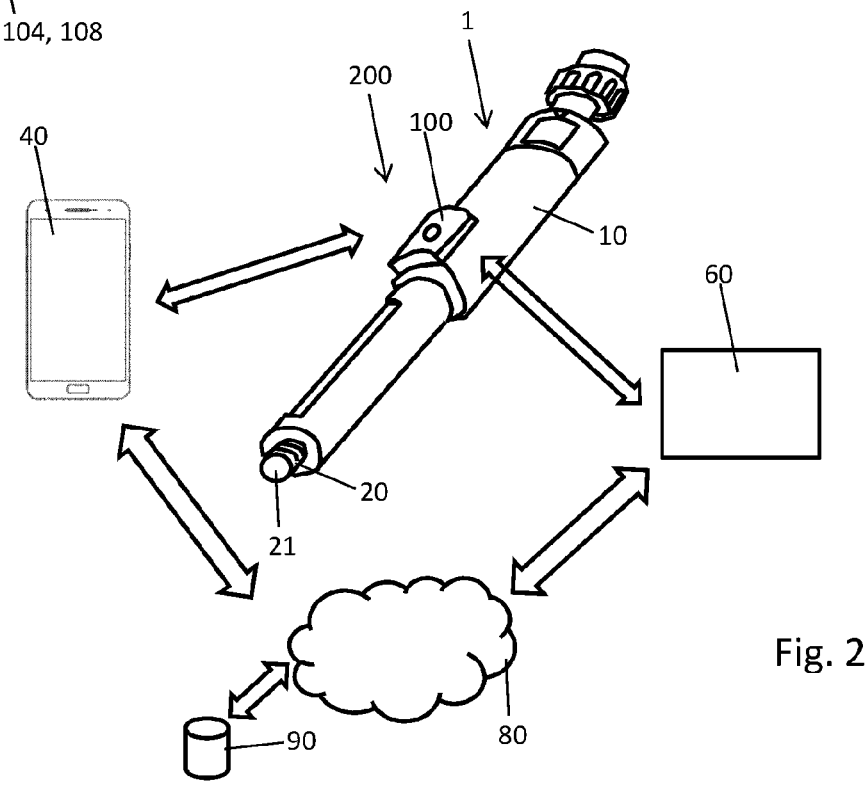
FIG. 2 is illustrative of a reminder system operable to remind a person to administer a medicament by using a drug delivery device.
Figure 5:
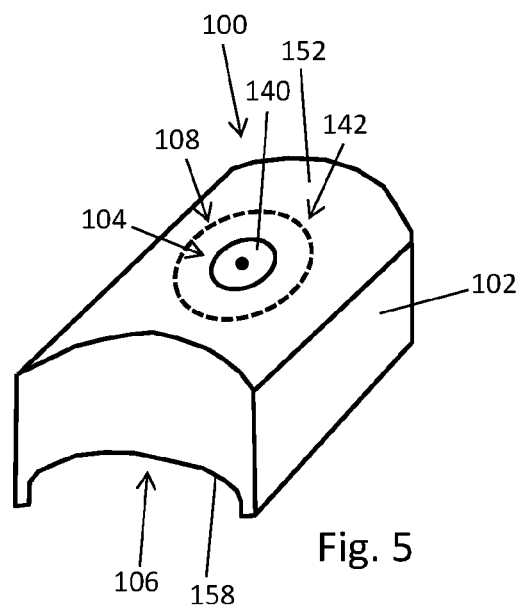
FIG. 5 shows one example of an auxiliary device with an adhesive type fastener.

The injection device 1 as shown in FIGS. 1 and 2 can be implemented is a pre-filled disposable injection device that includes a housing 10 to which a needle assembly 15 can be affixed. The injection needle 15 is protected by an inner needle cap 16 and either an outer needle cap 17 or a protective cap 18 that is configured to enclose and to protect a distal section of the housing 10 of the injection device 1. The housing 10 may include and form a main housing part configured to accommodate a drive mechanism 30 as indicated in FIG. 5. The injection device 1 may further include a distal housing component denoted as drug container holder 14. The drug container holder 14 may be permanently or releasably connected to the main housing 10. The drug container holder 14 is typically configured to accommodate a drug container 6 that is filled with a liquid medicament. The drug container 6 may include a cartridge that is sealed towards a distal end by a pierceable seal, such as a septum.

As further indicated in FIG. 1 the injection device 1 includes a housing 10 and a container 6 filled with a liquid medicament. The container 6 provides a medicament reservoir. It may include a substantially tubular-shaped barrel or bottle filled with the liquid medicament. Towards a proximal direction 3 the medicament reservoir 6 may be closed by a displaceable bung 7 or stopper. The bung 7 may be in mechanical contact with a piston rod 26 configured for a stepwise distally directed displacement in order to urge the bung 7 further in distal direction and hence towards a distal outlet of the medicament reservoir 6. At or near the outlet the medicament reservoir 6 may include a pierceable membrane. The needle assembly 15 includes a threaded needle hub 22 configured for a screwed connection with the threaded socket 20 provided on a distal end of the drug container holder 14. As illustrated in FIG. 2, the very distal end of the drug container holder 14 includes a through opening 21 to receive a proximal tipped section of the injection needle 24. In particular, the injection device needle 24 of the needle assembly 15 intersects the needle hub 22 and includes a double-tipped cannula.

The injection device 1 includes a drive mechanism 30. The drive mechanism 30 includes the piston rod 26 operable to urge the bung in distal direction and to expel the medicament from the medicament reservoir 6, e.g. from a cartridge. A distal end of the piston rod 26 typically includes a pressure piece 28 having a radially widened structure compared to the elongated piston rod 26. The pressure piece 28 will get in direct mechanical contact with a proximal face of the bung 7 in order to displace the bung 7 relative to the sidewall of the medicament reservoir 6. The piston rod 26 may include a threaded rod that is in threaded engagement with the housing 10.

Figure 3:
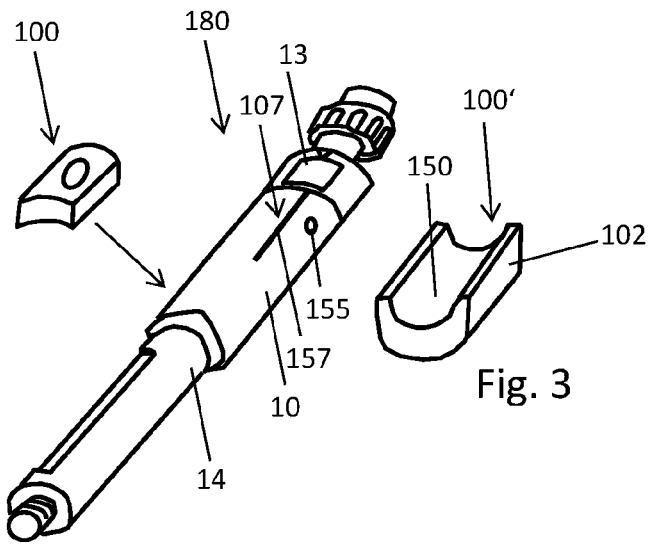
FIG. 3 shows two possible arrangements of how to attach an auxiliary device to a drug delivery device.
Figure 4:
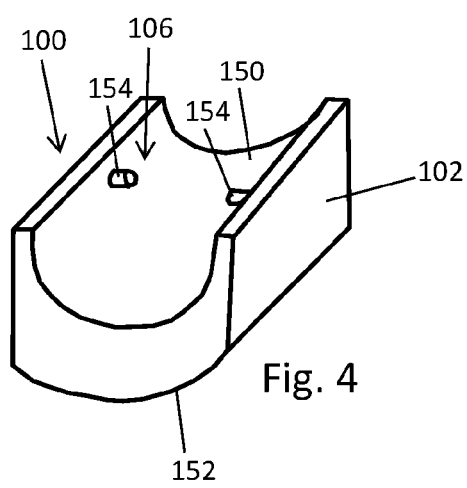
FIG. 4 shows one example of an auxiliary device with a snap member type fastener.

One example of a reminder system 200 is illustrated in FIG. 2. The reminder system 200 includes an auxiliary device 100. The auxiliary device 100 is illustrated in more detail in FIGS. 3-8 and 10. The auxiliary device 100 includes a housing 102. The housing 102 is provided with a fastener 106, typically located at a lower side 150 of the housing 102. In this way, the housing 102 can be fastened to an object 180 as indicated in FIGS. 2 and 3. Here, the object 180 is an injection device 1. The housing 102 and hence the auxiliary device 100 is permanently or releasably attachable to the housing 10 of the injection device 1. In an alternative embodiment the auxiliary device 1 may also be attached to or even integrated into the protective cap 18 of the injection device 1.

The auxiliary device 100 includes a wireless communication interface 114 that is configured to communicate with an external electronic device 40, 60. In the example of FIG. 2, the external electronic device 40 is implemented as a portable electronic device. The external electronic device 40 is implemented as a smart watch, as a smartphone, as a tablet computer or the like portable electronic component. With other examples and as illustrated further in FIG. 2 the wireless communication interface 114 of the auxiliary device 100 may also be configured to communicate with a non-portable or stationary external electronic device 60. For instance, the external electronic device 60 may be implemented as a router or as an access point providing a wireless network access.

Both, the external electronic device 40 and the external electronic device 60 may be configured to establish a further communication link to a network 80, e.g., to the internet and hence to a database 90. The database 90 may provide storage space for patient- or treatment-related data. For instance, a prescribed medication schedule may be stored in the database 90 and may become accessible via the network 80 and the communication link between the network 80 and the external electronic devices 40, 60. The wireless communication between the wireless communication interface 114 and the external electronic devices 40, 60 may be based on one of a plurality of available wireless data transmission standards, such as Wi-Fi, NFC, RFID or Bluetooth.

In a typical scenario the wireless communication interface 114 may be configured to communicate with the external electronic device 40 via a Bluetooth type wireless connection. It may communicate with the external electronic device 60 via a Wi-Fi wireless communication protocol. The communication link between the wireless communication interface 114 and hence the auxiliary device 100 with any one of the available external electronic devices 40, 60 may be of unidirectional type. It may also be of bidirectional type. When implemented as a unidirectional communication link the external electronic device 40, 60 is configured to generate and to transmit at least a signal generating request to the wireless communication interface 114 and hence to the auxiliary device 100.

Figure 10:
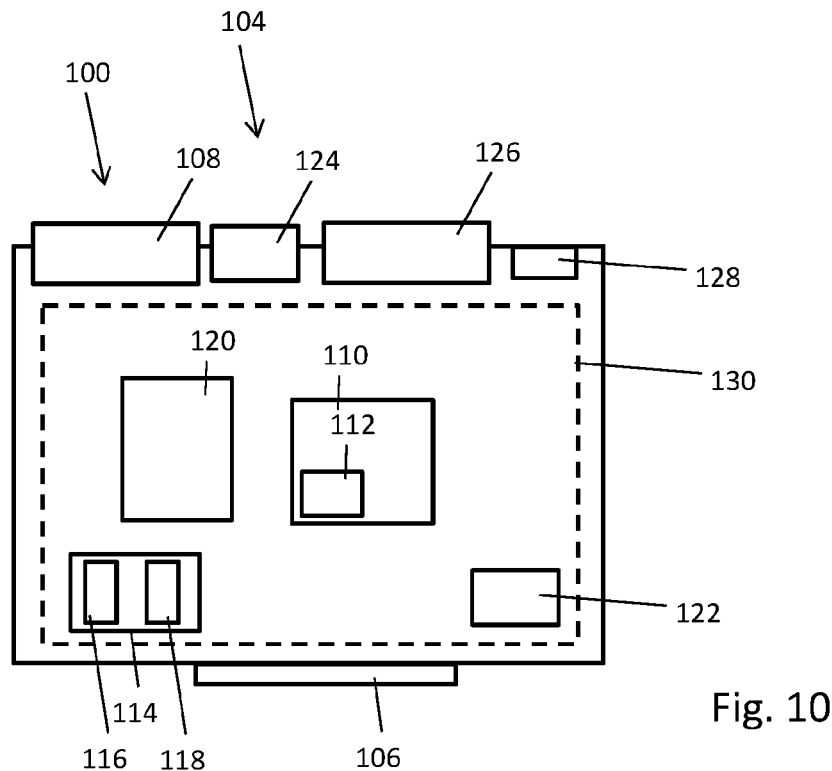
FIG. 10 shows a schematic block diagram of numerous components of an auxiliary device.

As indicated in FIG. 10 the auxiliary device 100 is equipped with a processor 110 and with a signal generator 104 connected to the processor 110. The at least one signal generator is configured to generate at least one signal perceivable by a person when triggered by the processor 110. In detail, the processor 110 is operable to trigger generation of a perceivable signal through the signal generator 104 in response to receive a signal generating request from the wireless communication interface 114. In this way and when the external electronic device 40, 60 generates and transmits a wireless signal generating request to the auxiliary device 100 the auxiliary device will generate a perceivable signal through the signal generator 104. In this way, a person typically using the drug delivery device 1 is reminded by the external electronic device 40, 60 to administer a medicament at a predefined point in time.

The signal generator 104 is configured to generate at least one of a visual signal, an audible signal and a haptic signal. For this, the signal generator 104 includes at least one of a visual signal generator 124, an acoustic signal generator 126 and a haptic signal generator 128. The visual signal generator 124 may be implemented as a visual indicator, e.g., including a light source, such as one or several LED. The acoustic signal generator 126 may include a speaker, such as a loud speaker or some other type of noise generating device. The haptic signal generator 128 typically includes a vibration device connected to or mechanically coupled to the housing 102 of the auxiliary device 100. When activated through the processor 110 the haptic signal generator 128 will induce a vibration of the housing 102 and hence of the entire auxiliary device 100.

Figure 7:
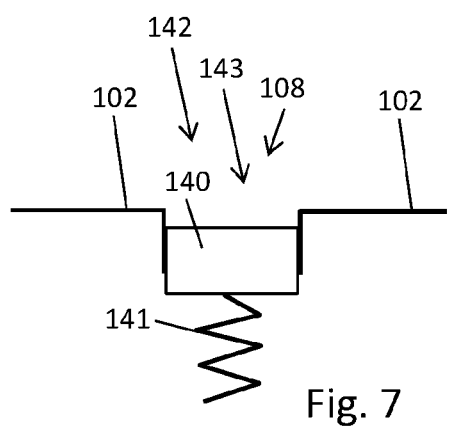
FIG. 7 shows a partial cross-section through the housing of an auxiliary device in the region of an input member.

The signal generator 104 may be configured to generate an alert sequence or signal sequence including numerous different types of visual, audible and haptic signals. The amplitude and/or frequency of at least one of the visual, audible and haptic signals may vary over time, e.g., increase continuously or in discrete steps once a signal generating request is processed by the processor 110 and induces activation of the at least one signal generator 104. The generation of the at least one signal continues until a user of the auxiliary device 100 actuates at least one input member 108 of the auxiliary device 100. The input member 108 may include a button 140 as illustrated in FIGS. 5, 7-9. The input member 108 includes a depressible button 140 arranged in a recess 142 or aperture 143 of the housing 102 of the auxiliary device 100. As shown in the example of FIG. 7 the button 140 is depressible further into the housing 102 against the action of a spring 141. Typically, the input member 108 and hence the button 140 is connected to at least one of the processor 110 and the signal generator 104. When actuating the input member 108 a signal generated by the signal generator 104 is interrupted, aborted or suspended.

When the communication link between the wireless communication interface 114 and the external electronic device 40, 60 is of bidirectional type, actuation of the input member 108 may be registered and/or logged and may be submitted as a feedback signal to the external electronic device 40, 60. Actuation of the input member 108, e.g., depressing of the button 140 can be regarded as a confirmation of the user, that he is aware that administering of a prescribed medicament is currently due and/or as a confirmation that a prescribed dose or amount of the medicament has been administered.

Figure 8:
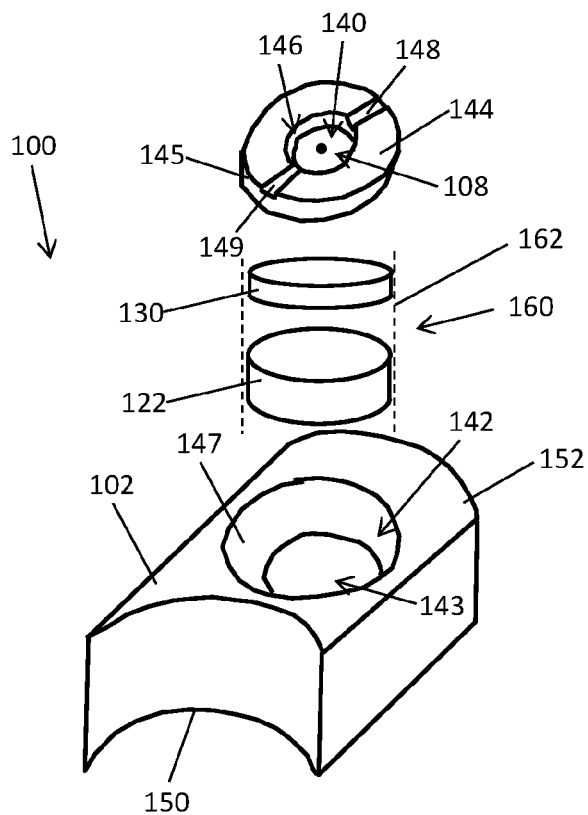
FIG. 8 is an exploded perspective view of one example of an auxiliary device.

With some examples and as illustrated in FIGS. 7 and 8 the depressible button 140 is arranged in a recessed configuration inside the housing 102. The depressible surface of the button 140 is arranged recessed compared to the outside surface of the housing 102. Hence, the depressible button 140 is countersunk in the recess 142 or in the aperture 143 of the housing 102. This helps to prevent unintentional actuation of the input member 108. In order to actuate the input member 108 a user has to intentionally enter the recess 142 or aperture 143 in order to reach the depressible button 140 and to urge the button 140 further into the housing 102.

With some examples, the diameter of the recess 142 or of the aperture 143 may be smaller than a typical diameter or cross-section of a finger of a user. It is conceivable, that only a rather small sized or pointed object, such as a tip of the inner needle cap 16 or outer needle cap 17 is sized to fit into the recess 142 or aperture 143. In this way, the user is obliged to make use of a component of the injection device 1 in order to suspend or to stop the signal generation.

With some examples, the at least one input member 108 and the signal generator 104 may be integrated into one component. Hence, the depressible button 140 may be illuminated. The depressible button 140 may include a transparent or semi-transparent surface and the depressible button may be further provided with at least one light source. With some examples there may be provided at least two or more light sources in the input member 108 and hence in the depressible button 140. The two or more light sources may be configured to generate visual signals of different color, different intensity and/or different brightness, thus indicating the relevance or urgency of the visual signal generated by the signal generator 104.

As indicated in FIG. 3, the auxiliary device 100 and the housing of the auxiliary device 102 can be attached or fixed to selected dedicated portions of the proximal housing 10 of the injection device. With one example, a lower side 150 of the housing 102 can be attached to a distal end of the proximal housing 10, e.g., in direct vicinity to a drug container holder 14. The auxiliary device 100' as illustrated in FIG. 3 could be attached to a proximal end of the housing 10. It could be attached as a sidewall of the housing 10 located opposite or remote from a dosage window 13 of the injection device 1.

For fixing and for attaching the housing 102 to the injection device 1 the housing 102 may include at least one fastener 106. The injection device, e.g., the housing 10 of the injection device 1 includes a counter-fastener 107 configured to engage with the fastener 106 of the auxiliary device.

With some examples, the housing 102 of the auxiliary device 100 may include a somewhat arc-shaped lower side 150 that conforms to the outer shape of the tubular housing 10 of the injection device 1.

When the fastener 106 includes a nut member 154, the counter-fastener typically includes one of a counter-snap member 155 to engage with the snap member 154 of the fastener 106.

Typically, one of the snap member 154 and the counter snap member 155 includes a protrusion 157 to engage with a groove 156 of the other one of the snap member 154 and the counter snap member 155. Hence, on the lower side 150 of the housing 100 into the may be provided a fastener 106, e.g., in form of at least one snap member 154 configured to engage with a counter-snap member 155 provided on the outside surface of the housing 10.

Figure 6:
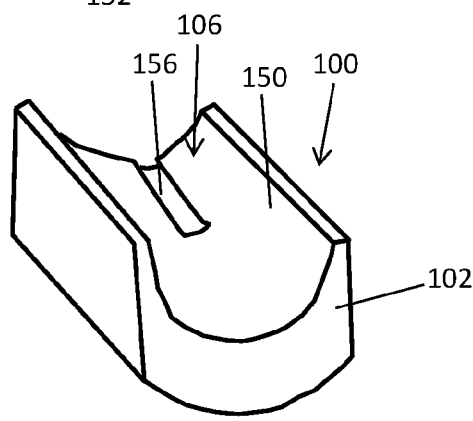
FIG. 6 shows a further example of an auxiliary device with a groove type fastener.

In another example as illustrated in FIG. 6 the lower side 150 of the housing 102 of the auxiliary device 100 includes a longitudinal groove 156 configured to engage with a correspondingly or complementary-shaped protrusion 157 provided on the outside surface of the housing 10. With both, the snap member 154, the counter-snap member 155 and with the groove 156 and the protrusion 157 the auxiliary device 100 can be engaged with and attached to the housing 10 in a form fitted way.

The presently illustrated examples of a fastener 106 of the housing 102 is only exemplary. With other examples it may be the housing 10 of the injection device 1 that is provided with a groove configured to engage with a correspondingly or complementary-shaped protrusion of the auxiliary device 100. The counter-snap member 155 of the housing may include a recess that is shaped to receive the snap member 154 configured as a protrusion. With other examples, the snap member 154 includes a recess on the lower side 150 of the housing 102 configured to engage a correspondingly-shaped protrusion provided on the outside surface of the housing 10 of the injection device 1.

With the fastener 106 configured to engage in a form fitting manner with a correspondingly-shaped counter fastener 107 provided on the injection device a releasable or detachable fastening of the auxiliary device 100 to the injection device 1 can be provided.

With the example of FIG. 5, the lower side 150 includes a fastener 106 provided with an adhesive 158. Here, at least a portion of the lower side 150 of the housing 102 is provided with an adhesive, e.g., with an adhesive coating or adhesive layer. By means of the adhesive 158 an adhesive attachment, e.g., a durable and non-releasable attachment of the auxiliary device 100 to the housing 10 of the injection device 1 can be provided.

In the example of FIG. 3, attachment of the auxiliary device 100 to an object 180, in form of a housing 10 of an injection device 1 is schematically illustrated. With other examples the auxiliary device can be likewise attached to the protective cap 18 of the injection device 1. With further examples the auxiliary device 1 may be integrated into the protective cap 18. Then, the housing 102 of the auxiliary device 100 may coincide with the protective cap 18. The signal generator 104 and/or the input member 108 may then be located at a distal end of the protective cap 18 as indicated in FIG. 1. With such an example the auxiliary device 100 is provided by the protective cap 18. The protective cap 18 can be attached to an object 180 that is formed by for coincides with the residual portions or components of the injection device 1.

The rather limited functionality of the auxiliary device enables a miniaturization of its physical implementation. In particular, the auxiliary device may only consist of a wireless communication interface 114, the processor 110 and the signal generator 104. These few components may be easily integrated into a rather compact housing 102 of an auxiliary device 100. The miniaturized implementation of the auxiliary device 100 enables an integration of the auxiliary device 100 into the protective cap 18 of the injection device 1, typically implemented as a pen-type injector.

With some examples the auxiliary device 100 is void of the at least one input member 108. Here, the auxiliary device may only consist of the housing, the wireless communication interface 114, the processor 110 and the signal generator 104. In order to suspend or to stop the signal generation the external electronic device 40, 60 may provide a respective emulated input member. Once the external electronic device 40, 60 has generated and submitted a signal generating request to the auxiliary device 100 it may provide a software implemented button or some other type of virtual input member 108, which upon actuation by the user induces a suspension or stop procedure with the external electronic device 40, 60.

Typically, the signal generator 104 and/or the input member 108 is or are located on or beneath an upper side 152 of the housing 102 of the auxiliary device 100. In this way, user-perceivable signals generated by the signal generator 104 are easily perceivable by the user and/or the input member 108 is easily accessible for the user when the auxiliary device 100 is attached or fixed to an object 180.

When depressing a virtual or emulated button on the external electronic device 40, 60 the external electronic device 40, 60 will generate and transmit a respective signal suspension request or signal stop request to the auxiliary device 100. When receiving the respective signal suspension request or signal stop request the processor 110 of the auxiliary device 100 will be operable to deactivate the at least one signal generator 104, thereby interrupting or stopping the signal generation.

In the further example of FIG. 8, the numerous electronic components of the auxiliary device 100, namely the processor 110, the wireless communication interface 114 and the signal generator 104 are arranged on a common printed circuit board 130. The printed circuit board 130 enables and provides a further miniaturization as well as a rather cost efficient mass-manufacturing of the auxiliary device. Typically, the auxiliary device 100 is also equipped with an energy storage 122.

The energy storage 122 may include or may constitute a battery, such as a button battery. The printed circuit board 130 and the energy storage 122 may form a stacked electronic assembly 160. Hence, the cylindrically-shaped button battery 122 and the printed circuit board 130 may be arranged coaxial on top of each other. In a typical example the energy storage 122 is arranged below or beneath the printed circuit board 130. The input member 108 may be attached to an oppositely located upper side of the printed circuit board 130. The input member 108 may be optionally also integrated into or assembled onto the printed circuit board 130. For arranging the stacked electronic assembly 160 in a recess 142 or aperture 143 of the housing 102 there may be provided a frame 162 as indicated in FIG. 8. The frame may provide a mounting platform for the energy storage 122 and the printed circuit board 130. Optionally, the frame 162 may also provide a mounting platform for a cover 144 configured to cover and to close the recess 142 and/or the aperture 143 once the printed circuit board 130 and the energy storage 122 have been assembled therein in a stacked configuration.

The frame 162 may be provided only optionally. With some examples, the cross-section of the recess 142 or of the aperture 143 is shaped to receive the energy storage 122 in a well-defined orientation. Hence, the outer circumference and/or the cross-section of the energy storage 122 may correspond or may be complementary-shaped to the inner cross-section or diameter of the recess 142 or aperture 143. An inside surface of the recess 142 may be provided with a threaded section 147. An outside section of the cover 144 may be provided with a correspondingly-shaped threaded section 145. The threaded section 145 is an outer thread and the threaded section 147 is typically implemented as an inner thread. In this way the cover 144 may engage with the sidewall of the recess 142 or aperture 143 when the stacked electronic assembly 160 is assembled and arranged inside the housing 102.

On an upside surface of the cover 144 there may be provided at least one elongated slit 148, 149. The two slits 148, 149 provide a receptacle for a screwing tool, such as a screwdriver. In this way, a screwdriver engaging with the grooves 148, 149 arranged geometrical to each other and extending in radial direction with regard to the center of the circular-shaped cover 144 can be screwed and fastened in the recess 142 or aperture 143. The cover 144 either includes a transparent material or the cover 144 includes a further recess 146 or aperture through which the signal generator 104 arranged on the printed circuit board 130 and located underneath the cover 144 is discernible or visible. In addition and when provided with an input member 108 the input member 108 may be reachable through the recess 146 or aperture of the cover 144.

Instead of the grooves 148, 149 an inside sidewall of the recess 146 may be provided with a screw socket, such as a hexagon socket to engage with a correspondingly-shaped wrench in a torque transmitting manner.

The screw type engagement of the cover 144 with the housing 102 is of particular benefit to provide access to the stacked electronic assembly 160 and to enable replacement or exchanging of the energy storage 122.

Figure 9:
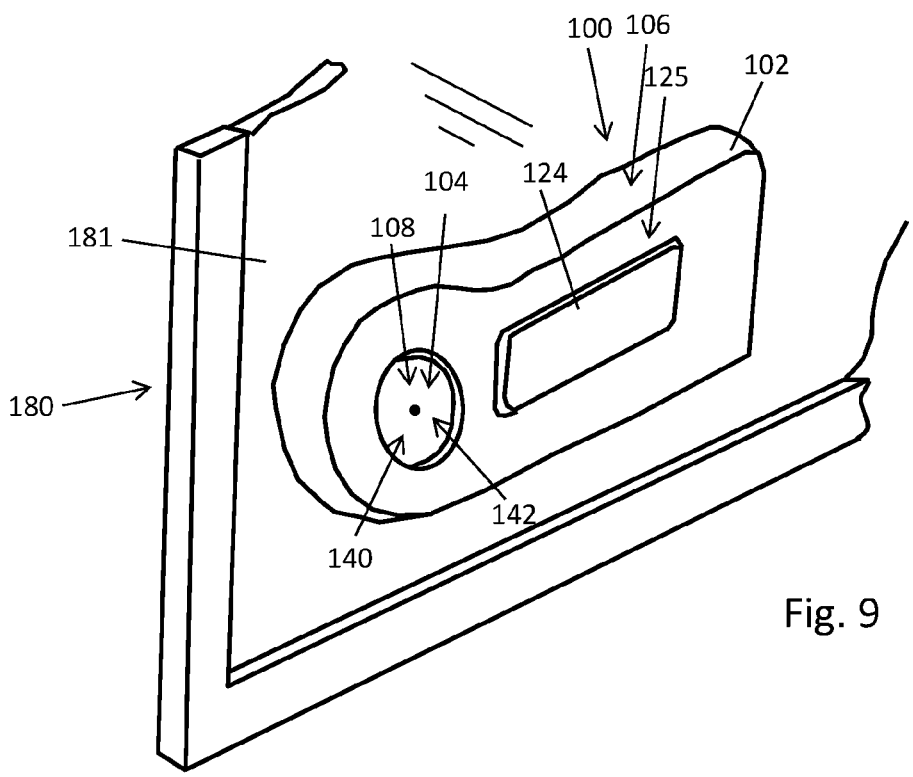
FIG. 9 shows an example of an auxiliary device adhesively attached to an object.

In the further example of FIG. 9 the auxiliary device 100 is of a different shape compared to the auxiliary device 100 as illustrated in FIGS. 2-8. Here, the housing 102 also includes an upper side 152 on which the signal generator 104 and the input member 108 are located. As illustrated in FIG. 9, the input member 108 is arranged in a countersunk configuration compared to the upper side 152 of the housing 102. The housing 102 and hence the auxiliary device 100 is further equipped with a two-dimensional display 125. The display 125 may serve as a visual signal generator 124. However, the auxiliary device 100 may be provided with a supplemental signal generator 104 that may be integrated into the at least one input member 108. Here, the input member 108 configured as a depressible button 140 may be illuminated by a light source of the signal generator 104.

The display 125 may provide supplemental information to the user once a signal generating request has been received from the external electronic device 40, 60. Information provided on the display 125 may be stored in an onboard data storage 120 of the auxiliary device 100. In case of a signal generating request and when a signal is generated the display 125 may concurrently provide useful information to the user about the handling of the drug delivery device 1 for setting and/or dispensing or injecting of a dose of the medicament.

In the example of FIG. 9, the auxiliary device 100 is adhesively attached to a plane-shaped surface 181 of an object 180. Here, the object 180 is a mirror, e.g., located in a bathroom of a user of the auxiliary device 100.

The auxiliary device 100 as illustrated in the block diagram of FIG. 10 includes a wireless communication interface 114 including a first transceiver 116 and a second transceiver 118. In this way, the auxiliary device 100 may communicate with different external electronic devices 40, 60. For instance, the wireless transceiver 116 may be configured to communicate with the external electronic device 40 via a first, e.g., a Bluetooth communication protocol and the further transceiver 118 may be operable or configured to communicate with another external electronic device 60 via a second, e.g., Wi-Fi communication protocol.

The auxiliary device 100 may be optionally equipped with an own data storage 120 connected to the processor 110. The processor 110 may optionally include a clock generator 112. In this way and after synchronization with data provided from a healthcare provider or a medical care giver via at least one of the external electronic devices 40 or 60 the auxiliary device 100 may also work in a stand-alone mode at least for a predefined time interval. Moreover, the data storage 120 may be operable and configured to store points in time at which a signal generating request has been processed by the processor 110 and when respective signals have been generated by the signal generator 104.

Moreover, the data storage 120 may be operable and configured to log or to monitor points in time at which a user of the auxiliary device 100 has actuated the input member 108. In the event that the auxiliary device 100 would be out of coverage of a wireless communication with the external electronic device 40, 60 the auxiliary device 100 may provide a limited stand-alone reminder function for the patient. However, if a maximum allowable and predefined time interval has lapsed the processor 110 and/or the signal generator 104 may autonomously generate a respective alert signal to the user, that synchronization or re-establishing of a wireless communication with the external electronic device 40, 60 is due.

Figure 11:
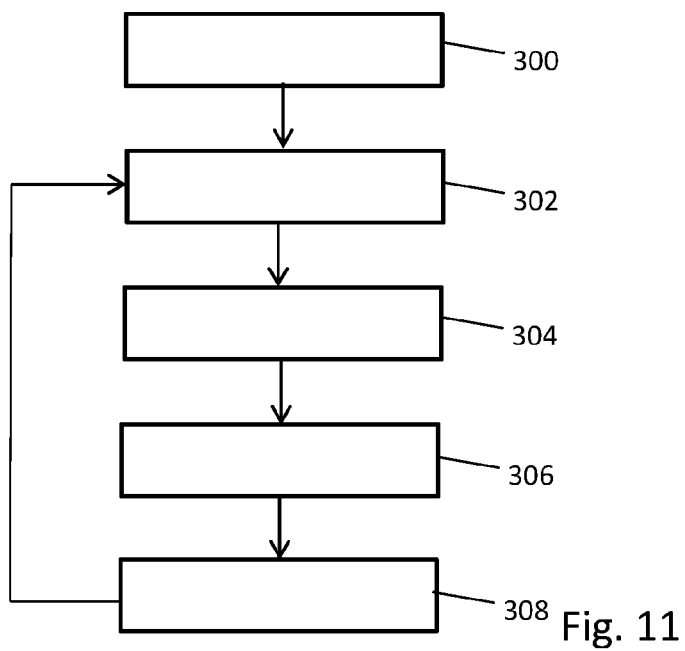
FIG. 11 shows a flowchart of a method of reminding a person to administer a medicament by using the auxiliary device.

In the flowchart of FIG. 11 one example of a method of reminding a person to administer a medicament is schematically illustrated. In a first step 300 the auxiliary device 100 is synchronized with at least one of an external electronic device 40, 60 and/or with a database 90 via a network 80. The synchronization with the database 90 may take place via a data communication link between the auxiliary device 100, at least one of the external electronic devices 40, 60 and the network 80. Once the auxiliary device 100 has been initialized the auxiliary device 100 and the associated external electronic device 40, 60 are mapped to each other. For instance, the auxiliary device 100 may be provided with a unique device identifier. In the process of initializing or in the process of an initial synchronizing this device identifier is transmitted to the external electronic device 40, 60 and/or to the database 90 via the network 80. In this way, a particular auxiliary device can be mapped to an individual medicament prescription schedule of a person.

After or with the initialization or initial synchronizing as executed in step 300 the wireless communication link between the auxiliary device 100 and the external electronic device 40, 60 has been established. In a proceeding step 302, the auxiliary device 100 is set in an idle state, in which the auxiliary device is waiting for receipt of a signal generating request submitted by the external electronic device 40, 60. In step 304 the signal generating request is actually generated by the external electronic device 40, 60 and is transmitted via the wireless communication link to the auxiliary device 100. Concurrent and/or after the receipt of the signal generating request received form the external electronic device 40, 60 the processor 110 and the signal generator 104 of the auxiliary device 100 trigger the generation of at least one of a visual, an audible or haptic signal thereby reminding the user of the device that administering of a medicament is currently due.

The generation of the user-perceivable signal continues until the user actuates an input member 108 in step 306. The input member 108 may be provided physically, e.g., in form of a depressible button 140 on the auxiliary device 100. With other examples, the at least one input member 108 is virtually provided or emulated by a software application of the external electronic device 40, 60. In either way and when the user actuates the input member 108 the generation of the user-perceivable signal is at least suspended or stopped. Furthermore and in response to the user actuating the input member 108 in step 306 the respective user interaction is logged or monitored in a data storage 120 in step 308. Thereafter the method continues returns to step 302 an the auxiliary device 100 waits again for the receipt of a signal generating request to be submitted by the external electronic device 40, 60 when the next medicament administering step will be due.

LIST OF REFERENCE NUMBERS

1 injection device
2 distal direction
3 proximal direction
4 dose incrementing direction
5 dose decrementing direction
6 drug container
7 bung
10 housing
11 trigger
12 dose dial
13 dosage window
14 drug container holder
15 needle assembly
16 inner needle cap
17 outer needle cap
18 protective cap
19 window
20 threaded socket
21 through opening
22 needle hub
24 injection needle
26 piston rod
28 pressure piece
40 external electronic device
60 external electronic device
80 network
90 database
100 auxiliary device 102 housing
104 signal generator
106 fastener
107 counter fastener
108 input member
110 processor
112 clock generator
114 wireless communication interface
116 transceiver
118 transceiver
120 data storage
122 energy storage
124 visual signal generator
125 display
126 acoustic signal generator
128 haptic signal generator
130 printed circuit board
140 button
141 spring
142 recess
143 aperture
144 cover
145 threaded section
146 recess
147 threaded section
148 groove
149 groove
150 lower side
152 upper side
154 snap member
155 counter snap member
156 groove
157 protrusion
158 adhesive
160 stacked electronic assembly
162 frame
180 object
181 surface
200 reminder system

The invention claimed is:

1. An auxiliary device for a drug delivery device, the auxiliary device comprising:
   a housing;
   a wireless communication interface configured to communicate with an external electronic device;
   a processor connected to the wireless communication interface and configured to process at least a signal generating request received from the external electronic device via the wireless communication interface;
   at least one signal generator connected to the processor and configured to generate at least one signal when triggered by the processor; and
   wherein the processor is operable to trigger the signal generator in response to receive a signal generating request from the wireless communication interface, and
   at least one input member connected to at least one of the processor and the at least one signal generator, wherein when actuated by a user, the at least one input member is operable to suppress or to deactivate the generation of the at least one signal by the signal generator.

2. The auxiliary device of claim 1, further comprising a fastener attached to the housing or integrated into the housing, the fastener being configured to attach the auxiliary device to an object.

3. The auxiliary device of claim 2, wherein the fastener is attached to or integrated into a lower side of the housing and wherein the fastener comprises at least one of an adhesive, a snap member and a groove or recess to establish a mechanical connection to the object.

4. The auxiliary device of claim 1, wherein the signal generator is configured to generate at least one of a visual signal, an audible signal and a haptic signal.

5. The auxiliary device of claim 1, wherein the at least one input member comprises a depressible button arranged in a recess of the housing.

6. The auxiliary device of claim 1, wherein the signal generator is integrated into the at least one input member.

7. The auxiliary device of claim 1, further comprising a data storage connected to the processor or integrated into the processor and configured to log at least one point in time at which:
   the signal generator is triggered; and/or
   the at least one input member is actuated by the user.

8. The auxiliary device of claim 1, wherein the at least one signal generator comprises a reconfigurable electronic display connected to the processor and wherein the processor is configured to modify a content of the electronic display in response to receive a signal generating request from the wireless communication interface.

9. The auxiliary device of claim 1, further comprising a printed circuit board and wherein the wireless communication interface, the processor and the signal generator are arranged on the printed circuit board.

10. The auxiliary device of claim 9, further comprising a stacked electronic assembly and wherein the housing comprises a recess or an aperture configured to receive the stacked electronic assembly, wherein the stacked electronic assembly comprises an energy storage, the printed circuit board and the at least one input member stacked on one another.

11. A reminder system operable to remind a person to administer a medicament by using a drug delivery device, the reminder system comprising:
   at least one auxiliary device comprising:
      a housing,
      a wireless communication interface configured to communicate with an external electronic device,
      a processor connected to the wireless communication interface and configured to process at least a signal generating request received from the external electronic device via the wireless communication interface,
      at least one signal generator connected to the processor and configured to generate at least one signal when triggered by the processor,
      at least one input member connected to at least one of the processor and the at least one signal generator, wherein when actuated by a user, the at least one input member is operable to suppress or to deactivate the generation of the at least one signal by the signal generator,
      wherein the processor is operable to trigger the signal generator in response to receive a signal generating request from the wireless communication interface; and
   an external electronic device operable to establish a wireless communication link to the wireless communication interface of the auxiliary device and operable to generate and to transmit a signal generating request to the auxiliary device.

12. The reminder system of claim 11, further comprising a drug delivery device, wherein the drug delivery device comprises at least one housing component, wherein the auxiliary device comprises a fastener attached to the housing or integrated into the housing, and wherein the auxiliary device is fastenable to the at least one housing component by the fastener.

13. The reminder system of claim 11, wherein the external electronic device is operable to trigger generation and transmission of a signal generating request automatically in accordance to an individually programmed and/or preconfigured schedule.

14. The reminder system of claim 11, wherein the auxiliary device further comprises a fastener attached to the housing or integrated into the housing, the fastener being configured to attach the auxiliary device to an object.

15. The reminder system of claim 14, wherein the fastener is attached to or integrated into a lower side of the housing and wherein the fastener comprises at least one of an adhesive, a snap member and a groove or recess to establish a mechanical connection to the object.

16. The reminder system of claim 11, wherein the signal generator is configured to generate at least one of a visual signal, an audible signal and a haptic signal.

17. A method to generate a reminder to administer a medicament by using an auxiliary device in combination with an external electronic device, the method comprising:
  establishing a communication link between the external electronic device and the auxiliary device;
  generating a signal generating request by the external electronic device;
  transmitting the signal generating request from the external electronic device to the auxiliary device;
  generating of at least one of a visual signal, an audible signal and a haptic signal by a signal generator of the auxiliary device in response to receiving the signal generating request from the external electronic device, and
  suppressing or deactivating the generation of the at least one of the visual signal, the audible signal and the haptic signal by the signal generator by actuating an input member of the auxiliary device.

18. A non-transitory machine-readable medium storing instructions executable by a processor of an auxiliary device according to claim 1 and/or executable by a processor of an external electronic device configured to establish a communication link with the auxiliary device, wherein execution of the instructions causes the processor to perform operations comprising:
  receiving a signal generating request from an external electronic device via the wireless communication interface of the auxiliary device
  trigger the signal generator of the auxiliary device to generate a signal in response to the receiving of the signal generating request; and
  suppressing or deactivating the generation of the signal by the signal generator in response to a user actuating an input member of the auxiliary device.

* * * * *